(12) United States Patent
Weikard et al.

(10) Patent No.: US 6,555,597 B1
(45) Date of Patent: Apr. 29, 2003

(54) PULVERENT BINDERS FOR POWDER COATING COMPOSITIONS CONTAINING OLIGO- AND POLYURETHANES HAVING (METH)ACRYLOYL GROUPS

(75) Inventors: Jan Weikard, Köln (DE); Christian Zwiener, Köln (DE); Wolfgang Fischer, Meerbusch (DE); Peter Thometzek, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/639,687

(22) Filed: Aug. 16, 2000

(30) Foreign Application Priority Data

Aug. 23, 1999 (DE) .......................... 199 39 843

(51) Int. Cl.⁷ ................................. C08F 2/46
(52) U.S. Cl. .................... 522/174; 522/90; 522/173; 522/111; 522/112; 528/68
(58) Field of Search .............. 522/90, 174, 173, 522/111, 112; 528/68

(56) References Cited

U.S. PATENT DOCUMENTS

| 5,068,305 A | 11/1991 | Meixner et al. ............... 410/49 |
| 5,620,751 A | 4/1997 | Brindoepke et al. ......... 427/506 |
| 5,703,198 A | 12/1997 | Twigt et al. ................. 636/303 |

FOREIGN PATENT DOCUMENTS

| CA | 2157658 | 3/1996 |

OTHER PUBLICATIONS

Journal of Coatings Tech., vol. 70, No. 884, Sep. 1998, pp. 57–62, Johansson et al.

Primary Examiner—James J. Seidleck
Assistant Examiner—Sanza L. McClendon
(74) Attorney, Agent, or Firm—Joseph C. Gil; Thomas W. Roy

(57) ABSTRACT

The present invention relates to pulverent binders for powder coating compositions which contain oligo- and polyurethanes having (meth)acryloyl groups, are curable by means of high energy radiation and have an organic solvent content of less than 1 wt. %. The present invention also relates to a process for preparing these binders in the absence of an organic solvent and to their use in powder coating compositions for coating wood, metal, plastic, mineral and/or preprimed substrates.

3 Claims, No Drawings

PULVERENT BINDERS FOR POWDER COATING COMPOSITIONS CONTAINING OLIGO- AND POLYURETHANES HAVING (METH)ACRYLOYL GROUPS

BACKGROUND OF THE INVENTION

1. Field of the Invention

The present invention relates to pulverulent binders containing specific oligo- and polyurethanes having (meth)acryloyl groups which may be applied to a substrate, melted by heating and cured by means of high energy radiation, especially UV radiation; to a process for their preparation; and to their use as a component of powder coating compositions.

2. Description of the Prior Art

Particularly high quality coatings from pulverulent binders are obtained using oligo or polyurethanes. Such compounds are described e.g. in EP-A 410242. They are prepared by reacting at least one organic polyisocyanate with at least one monohydric alcohol having (meth)acryloyl groups, and at least one isocyanate-reactive compound free from (meth)acryloyl groups.

These compounds must be prepared in an organic solvent. A solventless preparation is not possible due to the viscosities of urethane acrylates, which are known to be high at temperatures up to 120° C. Increasing the preparation temperature beyond 100 to 120° C. involves the risk, familiar to those skilled in the art, of a spontaneous undesirable polymerization of the compounds having (meth)acryloyl groups. Thus the disadvantage of the binders described in EP-A 410242 is that they must be prepared in an organic solvent, which has to be removed at high cost at the end of the preparation. Even small solvent residues strongly influence the melting behavior, which is critical to the application of the powder coatings.

To lower the melt viscosity of powder coatings based on unsaturated polyesters or polyacrylates with acryloyl functional groups, the powders are first prepared and then, according to EP-A 636 669, mixed with a low molecular weight crosslinking agent having vinyl ether, vinyl ester or (meth)acrylate functional groups. In the cited patent application, the polyacrylates with acryloyl functional groups and the crosslinking agent are also prepared in organic solvents, which subsequently have to be removed. Furthermore, mixtures of vinyl ethers or esters with unsaturated (meth)acrylates involve a considerably higher risk of an undesirable spontaneous polymerization (copolymerization of electron-rich and electron-deficient double bonds) than e.g. in the case of pure (meth)acrylate systems.

In Journal of Coatings Technology, vol. 70, no. 884, Sept. 1998, 57–62, A. Hult et al. describe radiation-curable powder coatings based on mixtures of amorphous polymers having methacrylate functional groups (polyacrylate) and crystalline (meth)acrylate monomers. Again, the polymers and monomers must be separately prepared using organic solvents, which have to be removed at high cost after the preparation.

An object of the present invention is to provide oligo- and polyurethanes having (meth)acryloyl groups, which are suitable as binders for powder coatings and which have a greatly reduced residual organic solvent content than prior art binders.

It has now been found that oligo- and polyurethanes having (meth)acryloyl groups can be prepared as binders for powder coatings without using solvents so that the residual organic solvent content is extremely low.

SUMMARY OF THE INVENTION

The present invention relates to pulverent binders for powder coating compositions which contain oligo- and polyurethanes having (meth)acryloyl groups, are curable by means of high energy radiation and have an organic solvent content of less than 1 wt. %.

The present invention also relates to a process for preparing pulverent binders for powder coating compositions containing oligo- and polyurethanes having (meth)acryloyl groups and curable by means of high energy radiation by reacting in the absence of an organic solvent A) a monoisocyanate or diisocyanate having 4 to 20 carbon atoms and B) a diisocyanate and/or a polyisocyanate that may be the same as A) or different from A) with C) a monohydroxyalkyl (meth)acrylate having 2 to 12 carbons in the alkyl chain, D) at least one alcohol having (meth)acryloyl groups that may be the same as C) or different from C) and E) a compound which is free of (meth)acryloyl groups and contains two or more isocyanate-reactive groups, wherein i) the equivalents of OH groups in C) corresponds to the equivalents of isocyanate groups in A), ii) the sum of the equivalents of OH groups in D) and the equivalents of isocyanate-reactive groups in E) corresponds to the equivalents of isocyanate groups in B) and iii) the amount of the reaction product of A) and C), based on the total weight of oligo- and polyurethanes having (meth)acryloyl groups, is 10 to 95 wt. %.

The present invention further relates to the use of the binders in powder coating compositions for coating wood, metal, plastic, mineral and/or preprimed substrates.

DETAILED DESCRIPTION OF THE INVENTION

The binders according to the present invention preferably contain 10 to 95 wt. % of the reaction product of component A) with component C) and 5 to 90 wt. % of the reaction product of component B) with components D) and E), wherein the percentages are based on the total weight of oligo- and polyurethanes having (meth)acryloyl groups. Preferably, the percentages of the reaction products add up to 100.

Suitable mono- or diisocyanates A) include aliphatic or aromatic isocyanates such as cyclohexyl isocyanate, butylene diisocyanate, hexamethylene diisocyanate (HDI), isophorone diisocyanate (IPDI), 3(4)-isocyanatomethylcyclohexyl isocyanate (IMCI), trimethylhexamethylene diisocyanate (2,2,4- and/or 2,4,4-trimethylhexamethylene diisocyanate), the isomeric bis(4,4'-isocyanatocyclohexyl)methanes, 1,4-cyclohexylene diisocyanate, phenyl isocyanate, toluyl isocyanate, 1,4-phenylene diisocyanate, 2,4- and/or 2,6-toluylene diisocyanate (TDI), 1,5-naphthylene diisocyanate, 2,4'- and/or 4,4'-diphenylmethane diisocyanate (MDI) and derivatives of the preceding isocyanates containing urethane, isocyanurate, allophanate, biuret, uretdione and/or iminooxadiazinedione groups, provided that these derivatives contain one or two free NCO groups. HDI, IPDI, TDI, MDI, the isomeric bis(4,4'-isocyanatocyclohexyl)-methanes, and mixtures thereof are preferred. IPDI, HDI and mixtures thereof are particularly preferred.

Component B) is selected from polyisocyanates having a functionality of at least 2. Suitable polyisocyanates include the known organic polyisocyanates from polyurethane chemistry, which have aliphatically, cycloaliphatically and/or aromatically bound isocyanate groups and a molecular weight of 144 to 1000, preferably 168 to 300. Examples include butylene diisocyanate, hexamethylene diisocyanate (HDI), isophorone diisocyanate (IPDI), 3(4)-isocyanatomethylmethylcyclohexyl isocyanate (IMCI), trimethylhexamethylene diisocyanate (2,2,4- and/or 2,4,4-trimethylhexamethylene diisocyanate), the isomeric bis(4,4'-isocyanato-cyclohexyl)methanes, isocyanatomethyl-1,8-octane diisocyanate, 1,4-cyclohexylene diisocyanate, 1,4-phenylene diisocyanate, 2,4- and/or 2,6-toluylene diisocyanate (TDI), 1,5-naphthylene diisocyanate, 2,4'- and/or 4,4'-diphenylmethane diisocyanate (MDI), 4,4',4''-triphenylmethane triisocyanate, derivatives of these polyisocyanates containing urethane, isocyanurate, allophanate, biuret, uretdione and/or iminooxadiazinedione groups, and mixtures of the preceding polyisocyanates. The derivatives preferably have a molecular weight of up to approx. 1000 and may be prepared in accordance with U.S. Pat. Nos. 3,124,605, 3,183,112, 3,919,218, 4,324,879 and EPA 798 299.

HDI, IPDI, TDI, MDI and/or polyisocyanates obtained by the trimerization of HDI, TDI or IPDI are preferably used as component B). HDI, IPDI and mixtures thereof are particularly preferred.

Monohydroxyalkyl (meth)acrylates C) are selected from hydroxyalkyl esters of acrylic acid or methacrylic acid having 2 to 12 carbon atoms, preferably 2 to 4 carbon atoms, in the hydroxyalkyl ester group. Examples include hydroxyethyl (meth)acrylate, 2- or 3-hydroxypropyl (meth)acrylate and 2-, 3- or 4-hydroxybutyl (meth)acrylate. 2-Hydroxyethyl acrylate is preferred.

The OH groups of C) are reacted with the NCO groups of component A) in approximately equivalent amounts, preferably in an OH:NCO equivalent ratio of 1:1.

Suitable alcohol components D) having (meth)acryloyl groups are acrylic acid or methacrylic acid esters of dihydric alcohols, which have a free hydroxyl group. Examples include 2-hydroxyethyl, 2- or 3-hydroxypropyl and 2-, 3- or 4-hydroxybutyl (meth)acrylate and mixtures thereof. Also suitable are monohydric alcohols having (meth)acryloyl groups or reaction products substantially containing these alcohols and obtained by esterifying n-hydric alcohols with (meth)acrylic acid. The alcohols used can also be mixtures of different alcohols, wherein n is an integer or a fractional number from 2 to 4, preferably 3. From (n-0.8) to (n-1.2) moles, preferably (n-1) mole, of (meth)acrylic acid is used per mol of said alcohols.

Examples include the reaction products of (i) glycerol, trimethylolpropane and/or pentaerythritol, low-molecular alkoxylation products of these alcohols (for example ethoxylated or propoxylated trimethylolpropane, such as the addition product of ethylene oxide and trimethylolpropane of OH number 550), and mixtures of these at least trihydric alcohols with dihydric alcohols (for example ethylene glycol or propylene glycol), with (ii) (meth)acrylic acid in the preceding molar ratio. The resulting reaction products have a molecular weight of 116 to 1000, preferably of 116 to 750 and more preferably of 116 to 158.

Preferably component D) is 2-hydroxyethyl acrylate.

Compounds E) are free from (meth)acryloyl groups; contain at least two, preferably 2 to 4 and more preferably 2 to 3 isocyanate-reactive groups, preferably alcoholic hydroxyl groups; and have a molecular weight of 62 to 200. Examples include ethylene glycol, 1,2- and 1,3-propanediol, neopentyl glycol, butanediol, hexanediol, glycerol, trimethylolethane, trimethylolpropane, pentaerythritol, sorbitol and di(trimethylpropane). Other suitable compounds, although less preferred, include the high molecular weight isocyanate-reactive compounds, especially polyols known from polyurethane chemistry. Examples include the known polyhydroxy polyethers or polyhydroxy polyesters having number average molecular weights above 200. However, the use of these high molecular weight compounds is only p possible in minor amounts because otherwise the melting range essential for powder coating binders cannot be met.

In a preferred embodiment polyester diols prepared from diols having a molecular weight of 62 to 400 and lactones are used completely or partially as component E). The preparation of such lactone polyesters is known per se. The molar ratios of diol to lactone are from 1:0.2 to 1:100, preferably from 1:0.5 to 1:5. Particularly preferred diols are 1,2-propanediol and 1,3- or 1,4-butanediol. The particularly preferred lactone is ε-caprolactone.

The sum of number of equivalents of isocyanate-reactive groups in components D) and E) corresponds to the number of equivalents of isocyanate groups in component B) in the process according to the invention.

The reaction of hydroxy-functional acrylates with isocyanates is known e.g. from P.K.T. Oldring (ed.), Chemistry & Technology of UV & EB Formulations For Coatings, Inks & Paints, vol. 2, 1991, SITA Technology, London, pp. 73–97.

In one embodiment for carrying out the process according to the invention isocyanate-containing components A) and B) are reacted with components C), D) and E), with the passage of an oxygen-containing gas, preferably air, at a temperature above the melting point of the product to be prepared (e.g., at a temperature of 30 to 140° C.) until the NCO content has fallen below 0.1 wt. %. Component C), D) and E) can be charged successively and separately; simultaneously and separately; or as a mixture. All of a portion of component E) is preferably added last.

In another embodiment components C), D) and E) are reacted with isocyanates A) and B) under the preceding conditions. Again, components A) and B) can be charged simultaneously, successively, as a mixture or separately. If appropriate, not all of components C), D) and E) are initially added; a portion or all of component E) is not charged until the reaction is substantially complete.

The addition reaction to form the oligo- and polyurethane can be accelerated in a manner known by the addition of suitable catalysts. Examples include tin octoate, dibutyltin dilaurate or tertiary amines such as dimethylbenzylamine. The urethane acrylate obtained as the reaction product can be protected from premature and undesirable polymerization by the addition of suitable inhibitors and antioxidants, for example phenols and/or hydroquinones, in amounts of 0.001 to 0.3 wt. %, based on the polyurethane, in each case. These additives can be added before, simultaneously with and/or following the reaction to form the polyurethane.

The compounds can also be reacted in a tubular reactor, static mixer or reaction kneader. Compared with batch reactions in a reaction tank, very short reaction times (<30 min) at elevated temperatures (80 to 200° C.) may be used. In this process variant the reactants flow continuously, e.g. through a tubular reactor, and are reacted as they flow.

The polyurethanes or urethane acrylates obtained by the process according to the invention represent valuable binders for powder coating compositions. They are distinguished in particular by an extremely small amount of organic solvents. Products according to the invention have an organic solvent content of less than 1 wt. %, preferably less than 0.5 wt. %, more preferably less than 0.1 wt. % and most preferably less than 0.05 wt. %. They can be processed as thermally crosslinkable powder varnishes without further additives (in which case the binder would be identical to the coating composition) or, preferably, the known additives used in coating technology can be added. Examples include pigments such as titanium dioxide, flow control agents such as polybutyl acrylate or silicones, degassing agents such as benzoin. The additives are homogenized, e.g. on extruders or kneaders, at temperatures of approx. 40 to 140° C., preferably 60–80° C. Another alternative is to stir the additives into the melt as soon as the preparation has ended.

The solid obtained is then ground in a manner known per se and coarse particles, preferably those with a size greater than 0.1 mm, are removed by sieving.

The resulting pulverulent coating compositions can be applied to the shaped parts to be coated by conventional powder application processes, e.g. electrostatic powder spraying, triboelectric application or whirl sintering. The coatings are then initially melted heating (e.g. using IR radiation); a clear film forms, provided no pigments or flatting agents or the like have been incorporated. The temperature required for the powder to melt and flow is above the melting range of the coating composition. The coatings can be cured either by heating to a temperature of 130–220° C., preferably 150–190° C., and/or by the action of high energy radiation such as UV or electron beam radiation.

For crosslinking with UV radiation, photoinitiators have to be homogeneously incorporated into the coating compositions.

The known photoinitiators are suitable, provided they do not have an adverse effect on the powder properties such as flowability and storage stability. Examples include 1-hydroxycyclohexyl phenyl ketone, benzildimethylketal or—in the case of pigmented systems—2-methyl-1-(4-(methylthio)phenyl)-2-morpholinopropan-1-one or trimethylbenzoyl-diphenylphosphine oxide.

The photoinitiators are used in amounts of 0.1 to 10 wt. %, preferably of 0.1 to 5 wt. %, based on the weight of the polyurethanes. The photoinitiators can be used individually or, because of frequent advantageous synergistic effects, they can also be used in combination with one another.

EXAMPLES

In the following examples, all percentages are by weight.

Example 1

525.0 g of hexamethylene diisocyanate, 0.6 g of dibutyltin dilaurate, 0.5 g of 2,5-ditert.-butylhydroquinone and 2.5 g of 2,6-ditert.-butyl-4-methylphenol were placed in a heatable 4 liter reaction vessel equipped with stirrer, dropping funnel, gas inlet tube and internal thermometer, and heated to 80° C. with stirring and with the passage of air (3 l/h). 725.0 g of 2-hydroxyethyl acrylate were metered in so that the internal temperature did not exceed 90° C. Stirring was then continued at 90° C. until the NCO content fell below 0.2%.

781.3 g of isophorone disocyanate and a further 0.6 g of dibutyltin dilaurate, 0.5 g of 2,5-ditert.-butylhydroquinone and 2.5 g of 2,6-ditert.-butyl-4-methylphenol were then added. At 80 to 90° C., 245.0 g of 2-hydroxyethyl acrylate were metered in first, followed by 220.0 g of trimethylolpropane. Stirring was continued until the NCO content of the reaction mixture was below 0.2%. The hot melt was then poured into an aluminum dish, where it slowly solidified and crystallized. The cooled crystalline product was mechanically comminuted.

Example 2

588.3 g of isophorone diisocyanate, 0.6 g of dibutyltin dilaurate, 0.5 g of 2,5-ditert.butylhydroquinone, 1.1 g of 2,6-ditert.-butyl-4-methylphenol and 1.1 g of methoxyphenol were placed in a heatable 2 liter reaction vessel equipped with stirrer, dropping funnel, gas inlet tube and internal thermometer, and heated to 80° C. with stirring and with the passage of air (3 l/h). At 80 to 90° C., 382.8 g of 2-hydroxyethyl acrylate were metered in first, followed by a mixture of 44.7 g of trimethylolpropane and 98.2 g of 3(4),8(9)-bishydroxymethyltricyclo-5.2.1.0$^{2.6}$-decane. Stirring was continued until the NCO content of the reaction mixture was below 0.2%. The hot melt was then poured into an aluminum dish, where it slowly solidified and crystallized. The cooled crystalline product was mechanically comminuted.

Example 3

1180.0 g of isophorone diisocyanate, 1.1 g of dibutyltin dilaurate, 0.9 g of 2,5-ditert.butylhydroquinone, 2.2 g of 2,6-ditert.-butyl-4-methylphenol and 2.2 g of p-methoxyphenol were placed in a heatable 4 liter reaction vessel equipped with stirrer, dropping funnel, gas inlet tube and internal thermometer, and heated to 80° C. with stirring and with the passage of air (3 l/h). At 80 to 90° C., 858.0 g of 2-hydroxyethyl methacrylate were metered in first, followed by 176.0 g of trimethylolpropane. Stirring was continued until the NCO content of the reaction mixture was below 0.2%. The hot melt was then poured into an aluminum dish, where it slowly solidified and crystallized. The cooled crystalline product was mechanically comminuted.

Example 4

333.0 g of isophorone diisocyanate, 200.1 g of toluene diisocyanate (Desmodur T65, Bayer A G, Leverkusen), 0.5 g of dibutyltin dilaurate, 0.4 g of 2,5-ditert.-butylhydroquinone, 1.0 g of 2,6-ditert.-butyl-4-methylphenol and 1.0 g of p-methoxyphenol were placed in a heatable 2 liter reaction vessel equipped with stirrer, dropping funnel, gas inlet tube and internal thermometer, and heated to 80° C. with stirring and with the passage of air (3 l/h). At 80 to 90° C., 382.8 g of 2-hydroxyethyl acrylate were metered in first, followed by 89.3 g of trimethylolpropane. Stirring was continued until the NCO content of the reaction mixture was below 0.2%. The hot melt was then poured into an aluminum dish, where it slowly solidified and crystallized. The cooled crystalline product was mechanically comminuted.

Example 5

588.3 g of isophorone diisocyanate, 0.6 g of dibutyltin dilaurate, 0.5 g of 2,5-ditert.butylhydroquinone, 1.1 g of 2,6-ditert.-butyl-4-methylphenol and 1.1 g of p-methoxymethanol were placed in a heatable 4 liter reaction vessel equipped with stirrer, dropping funnel, gas inlet tube and internal thermometer, and heated to 80° C. with stirring and with the passage of air (3 l/h). At 80 to 90° C., 429.0 g of 2-hydroxyethyl methacrylate were metered in first, followed by a mixture of 30.7 g of glycerol and 72.0 g of 1,4-cyclohexanedimethanol. Stirring was continued until the NCO content of the reaction mixture was below 0.2%. The hot melt was then poured into an aluminum dish, where it slowly solidified and crystallized. The cooled crystalline product was mechanically comminuted.

Example 6

445.2 g of hexamethylene diisocyanate, 0.6 g of dibutyl tin dilaurate, 0.5 g of 2,6-ditert.-butyl-4-methylphenol and 1.1 of p-methoxyphenol were placed in a heatable 4-liter reaction vessel equipped with a stirrer, dropping funnel, gas inlet tube and internal thermometer and heated to 80° C. with stirring and with the passage of air, at 80 to 90° C. a mixture of 371.2 g of 2-hydroxyethyl acrylate and 261.0 g of a lactone polyester prepared from 1.0 mole of 1,4-butanol and 1.5 moles of ε-caprolactone was added. Stirring was continued until the NCO content of the reaction mixture was below 0.1%. Then the hot melt was poured into an aluminium dish, where it solidified and crystallized. The cooled, crystallized product was mechanically comminuted.

Example 7

The coating properties were tested by first producing films from the binders of Examples 1–5 by a simplified process and then testing their scratch resistance and solvent resistance. This was done by finely grinding 5.0 g of each binder with 0.2 g of a photoinitiator (Irgacure 907, Ciba Specialty Chemicals, Lampertheim) in a mortar and applying the mixture in a layer thickness of approx. 0.1 mm, by means of a sieve of mesh size 0.5 mm, to iron plates which had been pretreated with a cathodic dipping varnish (Bonder). The plates were kept at a temperature of 90° C. for 20 min in an oven. A homogeneous liquid film formed in all cases. The hot plates were then immediately moved past a UV radiator (high pressure mercury vapor lamp, 80 W/cm, distance 20 cm, belt speed 1 m/min). The films hardened instantly and were evaluated after cooling to room temperature and storage for 60 min.

The solvent resistance was assessed using a wad of cotton wool soaked in butyl acetate, which was moved back-and-forth over the films 100 times with a surface pressure of approx. 1 kg. The scratch resistance was tested by scratching with the fingernail. The films were all solvent resistant. The films of Examples 1), 2) and 4) exhibited very good scratch resistance and the films of Examples 3) and 5) exhibited good scratch resistance.

Example 8

To test the powder properties, 96 wt. % of the binder from Example 1 was first premixed with 3 wt. % of a photoinitiator (Irgacure 2959, Ciba Specialty Chemicals, Lampertheim) and 1 wt. % of a flow control agent (Byk LPG 6952, Byk Chemie, Wesel) in a Premixer Pilot (Prism) for 30 seconds at 2500 rpm. The mixture was then processed further in an extruder of the MT 19 PC type (APV) at a temperature of 45° C. in zones 1 and 2 and 300 rpm at approx. 60% load. After crystallization, the extruded mixture was coarsely comminuted mechanically and then ground in a classifier mill of the ICM4 type (Neumann und Esser) with the classifier set at 30 m/s and the rotor at 100 m/s. After sieving to exclude ground material with a diameter greater than 90 μm, the resulting powder was sprayed with an electrostatic gun (Wagner) at 80 kV onto an iron plate which has been pretreated with a cathodic dipping varnish (Bonder). The plate was kept at a temperature of 100° C. for 5 min in an oven. A homogeneous liquid film formed. The hot plate was then immediately moved past a UV radiator (high pressure mercury vapor lamp, 80 W/cm, distance 20 cm, belt speed 5 m/min). The film hardened instantly and was evaluated after cooling to room temperature and storage for 60 min. Layer thickness 80 to 100 μm.

The solvent resistance was assessed using a wad of cotton wool soaked in butyl acetate, which was moved back-and-forth over the film 100 times with a surface pressure of approx. 1 kg. The scratch resistance was tested by scratching with the fingernail. The film was solvent resistant and scratch resistant.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A pulverent binder for a powder coating composition which contains oligo- and polyurethanes having (meth) acryloyl groups, is.curable by means of high energy radiation and contains less than 1 wt. % of organic solvents wherein the binder comprises 10 to 95 wt. %, based on the total weight of oligo- and polyurethanes having (meth) acryloyl groups, of the reaction product of A) a monoisocyanate or diisocyanate having 4 to 20 carbon atoms with C) a monohydroxyalkyl (meth)acrylate having 2 to 12 carbons in the alkyl chain and 5 to 90 wt. %, based on the total weight of oligo- and polyurethanes having (meth)acryloyl groups, of the reaction product of B) a diisocyanate and/or a polyisocyanate that may be the same as A) or different than A) with D) at least one alcohol having (meth)acryloyl groups that may be the same as C) or different than C) and E) a compound which is free of (meth)acryloyl groups and contains two or more isocyanate-reactive groups.

2. The pulverent binder of claim 1 wherein the compound which is free of (meth)acryloyl groups and contains two or more isocyanate-reactive groups comprises 10 to 100 wt % of a lactone polyester.

3. A powder coating composition containing the pulverent binder of claim 1.

* * * * *